March 23, 1954
M. J. WEINBERG
2,672,683
DEVICE FOR CUTTING AND REMOVING A SLAB OF PLASTIC MATERIAL
Filed April 7, 1950
2 Sheets-Sheet 1
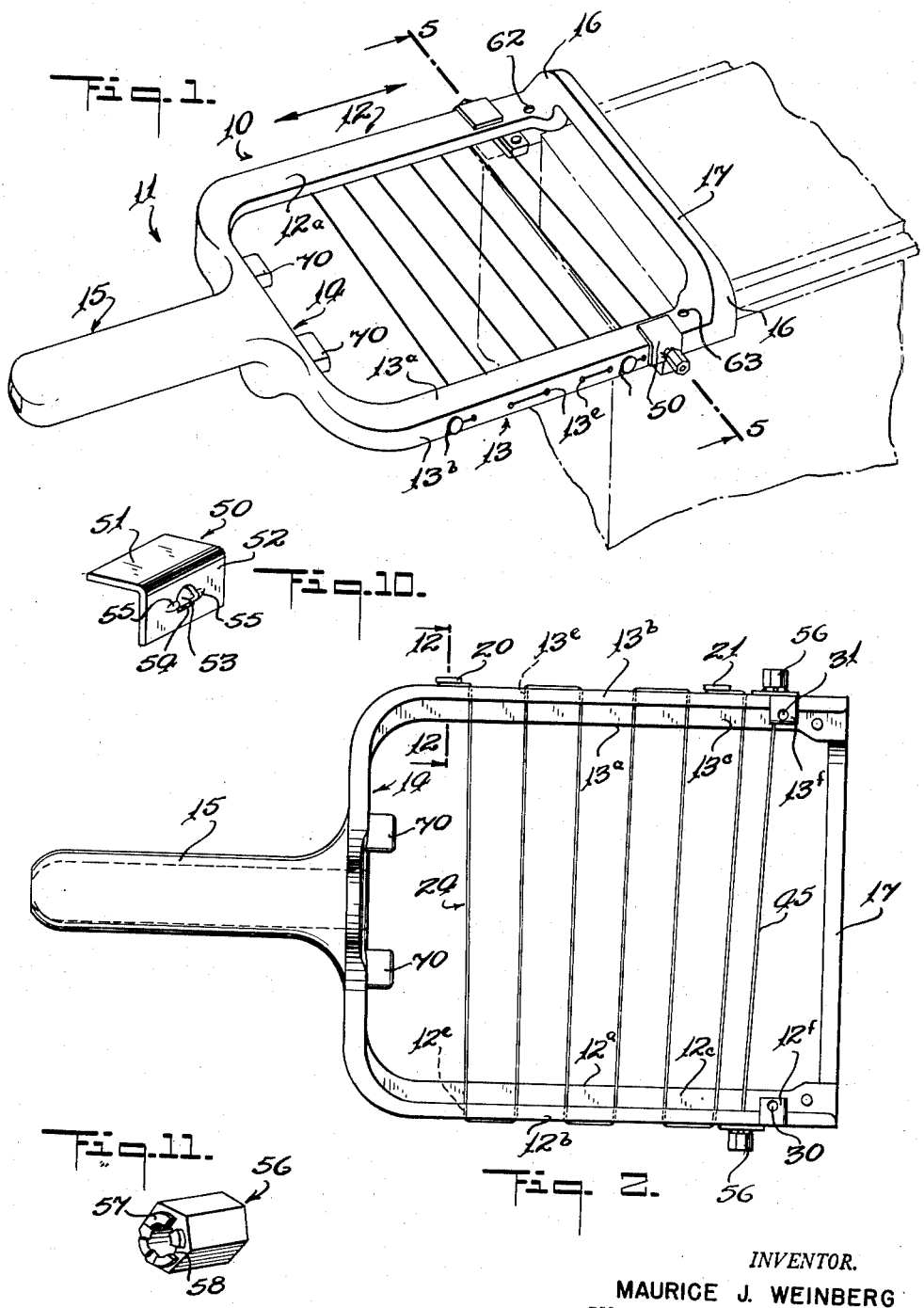
INVENTOR.
MAURICE J. WEINBERG
BY
ATTORNEY March 23, 1954
M. J. WEINBERG
2,672,683
DEVICE FOR CUTTING AND REMOVING
A SLAB OF PLASTIC MATERIAL
Filed April 7, 1950
2 Sheets-Sheet 2
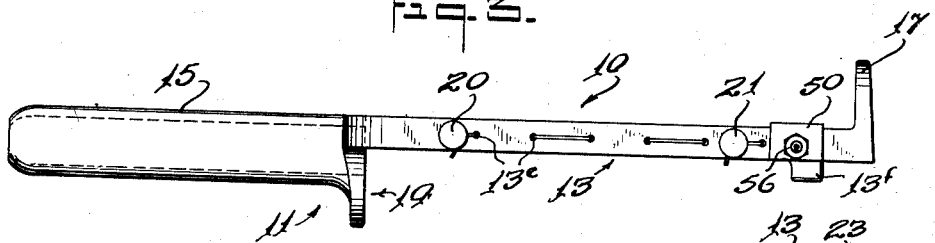
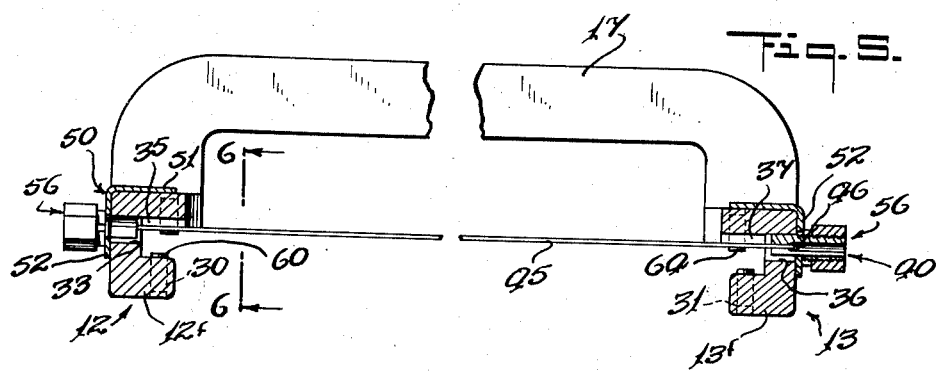
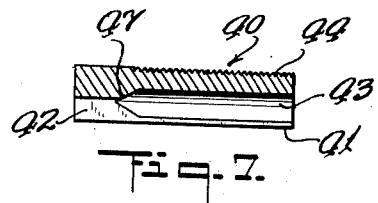
INVENTOR.
MAURICE J. WEINBERG
BY
*J. B. Felshin*
ATTORNEY

Patented Mar. 23, 1954

2,672,683

UNITED STATES PATENT OFFICE 2,672,683

DEVICE FOR CUTTING AND REMOVING A SLAB OF PLASTIC MATERIAL

Maurice J. Weinberg, New York, N. Y.

Application April 7, 1950, Serial No. 154,669

8 Claims. (Cl. 30—117)

This invention relates to devices for cutting and removing a slab of butter or the like plastic material from a block of such material. It is particularly directed to a remover frame having means to engage the flanges of a chamber in which the block of butter is pressed upwardly to project above the upper end of the chamber so that as the remover frame is moved across the top of the chamber a top layer or slab, or layer of impressed butter pats may be cut from the block and removed from the butter chamber. The device in which the instant remover frame may be used is shown and described in my copending application, Serial No. 773,817, filed on September 17, 1947, now Patent No. 2,624,941.

An object of this invention is to generally improve a device for cutting a slab from a block of soft material such as butter or the like, shown and described in my copending application, Serial No. 773,818, filed on September 13, 1947, now Patent No. 2,589,911.

Another object of this invention is to provide a device of the character described comprising a frame having parallel arms, a metal cutter wire interconnecting said arms, adjacent the front end thereof, for cutting the butter or like material, and a carrier bed comprising a non-metallic thread or cord such as synthetic plastic cord laced back and forth through openings in said parallel arms, on which the cut slab rests and is carried after cutting through the butter and thereafter raising the device.

Still another object of this invention is to provide highly improved means on the parallel arms for stretching or tensioning the cutter wire.

Yet another object of this invention is to provide a remover frame of the character described having means to receive outwardly extending side flanges at the open end of a butter chamber so that the remover frame may be slidably moved along the top of the butter chamber and means to guide the remover frame relative to the butter chamber.

A further object of this invention is to provide a remover frame of the character described comprising a frame member, a metal cutter wire at the forward end of the frame for cutting butter, cheese, or the like soft plastic material, means to tension the metallic cutter wire, and a carrier bed comprising a single piece of synthetic plastic cord laced back and forth from one side of the frame to the other, and means to anchor the ends of the cord.

Yet a further object of this invention is to provide a highly improved remover frame of the character described, comprising a frame member having parallel arms, each having an inwardly extending flange and a downwardly extending flange, and a carrier bed substantially contacting the undersurfaces of the inwardly extending flanges of said arms, whereby to insulate said flanges from the flange of a butter chamber engaged by the remover frame when cutting a slab of butter therefrom, to prevent friction, corrosion or electrolytic action.

Yet a further object of this invention is to provide a remover frame of the character described in which the downwardly extending flanges are provided with means to prevent contact of the inwardly extending flanges and lugs with the flanges of a butter chamber, whereby to prevent electrolytic action.

A still further object of this invention is to provide a highly improved remover frame of the character described, provided with a metal cutter wire, a non-metallic carried bed, means to prevent electrolytic action between the frame and the butter chamber when cutting slabs of butter therefrom, and means to prevent friction between the remover frame and the butter chamber.

Still another object of this invention is to provide a durable remover frame of the character described which shall be relatively inexpensive to manufacture, and yet practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention, Fig. 1 is a perspective view of a remover frame embodying the invention and illustrating the same in position for cutting a slab of butter projected above a butter chamber, and engaging the flanges of the upper end of the butter chamber;

Fig. 2 is a bottom plan view of the remover frame embodying the invention;

Fig. 3 is a side elevational view thereof;

Fig. 4 is a front elevational view thereof;

Fig. 5 is a cross-sectional view taken on line 5—5 of Fig. 1;

Fig. 6 is a cross-sectional view taken on line 6—6 of Fig. 5;

Fig. 7 is a longitudinal cross-sectional view of one of the anchoring screws for the cutter wire;

Fig. 8 is an end view of the screw shown in Fig. 7;

Fig. 9 is an opposite end view of the screw shown in Fig. 7;

Fig. 10 is a perspective view of one of the angle plates to retain the screw against rotation;

Fig. 11 is a perspective view of one of the lock nuts; and

Fig. 12 is a cross-sectional view taken on line 12—12 of Fig. 2.

Referring now in detail to the drawing, 10 designates a remover frame embodying the invention for cutting a slab of butter, cheese or other plastic material from a block of such material.

Said remover frame comprises a frame member 11, which may be made of aluminum, Duralumin or other suitable light-weight metal. The frame member 11 comprises a pair of parallel coextensive arms 12, 13, interconnected at their rear ends by a transverse portion 14, from which extends rearwardly a handle 15. Extending upwardly from the forward ends of the arms 12, 13, are inwardly curved portions 16 interconnected by a transverse portion 17 spaced above the plane of the arms 12, 13.

The arms 12, 13 are substantially similar and symmetrically disposed to one another. Each is of angular transverse cross-section. Thus, the arm 12 comprises a top inwardly extending flange 12a and a vertical flange 12b extending downwardly from the outer end of the flange 12a. Likewise, the frame 13 comprises a top horizontal inwardly extending flange 13a and a downwardly extending vertical flange 13b. At the underside of the flange 12a is an undersurface or shoulder 12c. At the underside of the flange 13a is an undersurface or shoulder 13c.

The flange 12b is formed with six horizontal through openings 12e and the flange 13b is formed with six horizontal through openings 13e. The openings 13e in the arm 13 are spaced somewhat further apart than are the openings 12e in the flange 12b. The openings 12e and 13e nearest the portion 14 of the frame member are in alignment. However, due to the spacing, the opening 13e closest to portion 16 of arm 13 is closer thereto than is the opening 12e closest to portion 16 of arm 12. The openings 12e and 13e are in a plane adjacent the underside of the shoulders 12c and 13c.

Fixed to the outer surface of flange 13b of arm 13 is a pair of anchoring pegs 20, 21. Said pegs have heads 22 formed with inner conical surfaces 23. The peg 20 is located adjacent the opening 13e closest to the portion 16 on arm 13. Interlaced through the openings 12e and 13e is a cord 24 made of nylon, plastic or any other suitable flexible material. The outer ends of the cord are anchored by winding around pegs 20, 21 between the heads 23, and the outer surface of flange 13b of arm 13.

The tapered surface 23 causes the wound cord to be tightly wedged in place. The cord is laced back and forth as shown in Fig. 2 and the runs of the lacing become more and more inclined toward the front end of the remover frame. It will be noted that the cord 24 substantially contacts the surfaces 12c, 13c of the arms 12, 13.

Extending from the flanges 12b, 13b are inwardly extending projections or lugs 12f, 13f, spaced below and disposed parallel to the surfaces 12c and 13c. The projections or lugs 12f, 13f are spaced somewhat rearwardly of portions 16 of the frame member. The said lugs 12f, 13f are formed with vertical through openings 30, 31 respectively, for the purpose hereinafter appearing. Said openings 30, 31 are disposed below the undersurfaces 12c, 13c of the frame member.

Flange 12 is formed with a horizontal circular through opening 33 spaced rearwardly of the lug 12f. The surface 12c is formed with a longitudinal, substantially semi-circular notch 35 forming a continuation of the opening 33. Thus, a plane passing through the surface 12c will cut the opening 33, a major portion of the opening being below said plane and the notch 35 being somewhat less than a semi-cylindrical surface and above said plane.

The flange 13 is formed with a horizontal through opening 36 and surface 13c is formed with a notch 37, forming a continuation of part of said opening. The notch 37 is part-cylindrical. The openings 33, 36 are in alignment with each other and an axis passing through said openings is inclined to the arms 12, 13, being parallel to the adjacent run of the laced cord 24.

Extending through each of the openings 33, 36 is a screw 40. Said screw 40 is formed with a longitudinal flat 41. It is also formed with a longitudinal radial slot 42, extending through the screw. Said screw is also formed with a central axial drilled opening extending to one end thereof but terminating short of the other end thereof. Said screw 40 is furthermore formed with external screw threads 44 from one end thereof substantially to the opposite end thereof. The screws 40 are symmetrical with respect to the frame.

Interconnecting the screws is a metal, flexible cutter wire 45. At each end of the wire 45 is a knot 46, contacting the inner end 47 of the drilled opening 43. The wire 45 passes through the slots 42 of the screws 40.

Means is provided to stretch or tension the wire 45. To this end there is mounted on each of the arms 12, 13 an angle shaped plate 50 comprising a top, inwardly extending flange 51 and an outer downwardly extending flange 52. The flanges 51 contact the upper surfaces of the flanges 12a, 13a respectively. The flanges 52 contact the outer surfaces of the flanges 12b, 13b respectively.

The flange 52 of each member 50 is formed with a part-circular opening 53. Each opening 53 has a flat bottom edge 54. Each flange 52 furthermore is formed on opposite sides of opening 53 with a pair of outwardly pressed detents 55, for the purpose hereinafter appearing. The opening 53 is of such size as to slidably and non-rotatably receive one of the screws 40. Thus the flat edge 54 contacts the flat surface 41 of the screw to prevent turning of the screw relative to the flange 52.

The screws 40 are inserted through the openings 33 and 36 with the openings 43 pointing outwardly. Screwed on to the threaded portion 44 of each screw 40 is a lock nut 56 having internal screw threads to engage the threads 44. Each nut 56 may be of hexagonal exterior cross-section so that it may be turned by the use of a hexagonal socketed wrench. At the inner end of each nut 56 are a plurality of part-circular projections 57 forming a broken circular line around the threaded opening of the nut. Between adjacent projections 57 are slots 58. Pairs of said slots 58 are diametrically opposed to each other.

It will now be observed that when the nuts 56 are screwed onto screws 40, the nuts 56 will cause said screws to be moved outwardly, away from each other, thereby tensioning the cutting wire 45. As the nuts are tightened the detents 55 will snap into the slots 56 to keep the lock nuts from accidentally loosening. The nuts furthermore hold the angle-shaped members 50 in place on the arms of the remover frame.

Inserted into the openings 30 and 31 of the lugs 12f and 13f are pegs 60 of synthetic plastic material such as nylon. The upper ends of the pegs 60 project slightly above the upper surfaces of said lugs 12f, 13f.

The flanges 12a and 13a are formed with vertical through openings 62 and 63 respectively, adjacent the portions 16 of the remover frame. Inserted into these openings are pegs 64 of synthetic plastics, such as nylon, projecting slightly below the undersurfaces 12c and 13c of said flanges. The purpose of using the plastic or non-metallic pegs 60 and 64 is that when the device is in use the projecting portions of said pegs will prevent contact of the remover frame with the metal flange on the butter chamber to thereby prevent electrolytic action, as might result if the flanges 12a, 13a rode directly on the flanges of the butter chamber, since the metal of which the remover frame is made is different than the metal of which the butter chamber is made.

Likewise, the carrier cord 24 contacting the shelves or surfaces 12c and 13c make an insulation bed against friction between said surfaces and the upper surfaces of the flanges on the butter chamber which would cause corrosion of the metal on which the surfaces ride and which would also cause smudge. The dissimilar metals of the remover frame and the butter chamber would cause electrolytic action which is aggravated by the salt in butter or lactic acid or other acid. Such electrolytic action is avoided by the use of plastic or nylon thread 24 and the plastic or nylon pegs 60 and 64. The cutter wire 45 is made of metal for strength. It may also be made of synthetic plastic cord but better results are obtained by the combination of a metal cutter wire and a synthetic plastic or non-metallic carrier thread. You do not need as much tension on the carrier thread as on the cutter wire. Furthermore, by loosening the carrier thread, said thread is of substantially even tension.

In my copending application, Serial No. 773,818, filed on September 17, 1947, now Patent No. 2,589,911, the carrier bed is composed of individual metal wires with take-up means for each wire. By tightening each wire separately it is difficult to obtain uniformity of tension. If one wire were tightened more than the others, the others would loosen and the frame would have a tendency to bend or fracture. With the present construction the entire carrier cord is under one tension and not under too great a tension. The plastic inserts 60 and 64 at the top and bottom act as insulators against friction and prevent electrolysis. They may be driven into place in any suitable manner. The anchors 20 may be driven into suitable openings in the flange 13b or may be screwed into place if desired.

The handle 15 is hollow to reduce the weight of the device. At the inside of transverse portion 14 of the remover frame and at the opposite sides of the through opening in the hollow handle are inwardly projecting stops 70 to limit the movement of the remover frame during the cutting stroke.

It will be noted that the transverse member 17 is spaced above the cutter wire and carrier bed 24 so that the cut slab may pass thereunder. It will be noted furthermore, that the notches 36 and 37 permit the screws 40 to be moved inwardly beyond the flanges 12f and 13f without obstruction. Furthermore, it will be noted that the cutter wire 45 is aligned with said notches so as not to contact the surfaces 12c and 13c of the remover frame.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention I claim as new and desire to secure by Letters Patent:

1. A remover frame comprising a frame member having parallel arms, a transverse portion interconnecting the rear ends of said arms, a handle extending from said transverse portion, portions extending upwardly from the forward ends of said arms, and a transverse portion interconnecting said upwardly extending portions and disposed above said parallel arms, said arms being formed with through openings, a metal cutting wire passing through said openings, screws extending into said openings, said screws being formed with longitudinal flats, angle shaped members on said arms having flanges formed with openings through which said screws extend, the openings of said angle shaped members having flat edges contacting the flats on said screws, lock nuts screwed on to said screws, and said angle shaped members being formed with detents, and said lock nuts being formed with slots to engage said detents to prevent accidental unscrewing of said nuts.

2. A remover frame comprising a frame member having parallel arms, a transverse portion interconnecting the rear ends of said arms, a hollow handle extending rearwardly from the center of said transverse portion and being located in the plane of said arms, portions extending upwardly from the forward ends of said arms, and a transverse portion interconnecting said upwardly extending portions and disposed above the plane of said arms, said arms each being of angular cross-section and each comprising an upper, inwardly extending flange and an outer downwardly extending flange, said downwardly extending flanges being formed with through openings, a carrier bed comprising a non-metallic cord interlaced through said openings and interconnecting said arms, means to anchor the ends of said cord, said cord substantially contacting the undersurfaces of said inwardly extending flanges of said arms, and a cutter interconnecting said arms and located in advance of the carrier.

3. A remover frame comprising a light-weight metal frame member provided with a pair of parallel arms, a metal cutter wire at the forward end of the frame member interconnected between said arms and disposed transversely of said arms, a carrier bed on the frame comprising a single non-metallic cord interlaced on said frame and between said arms and having a plurality of runs, and means to tension the cutter wire to a greater tension than the carrier bed, said arms having inwardly extending flanges and downwardly extending flanges, and the carrier bed substantially contacting the undersurface of said inwardly extending flanges, said carrier bed comprising a cord having runs disposed transversely of said arms.

4. A remover frame comprising a light-weight metal frame member provided with a pair of parallel arms, a metal cutter wire at the forward end of the frame member interconnected between said arms and disposed transversely of said arms, a carrier bed on the frame comprising a single non-metallic cord interlaced on said frame and between said arms and having a plurality of runs, and means to tension the cutter wire to a greater tension than the carrier bed, said arms having inwardly extending flanges and downwardly extending flanges, and the carrier bed substantially contacting the undersurface of said inwardly extending flanges, said carrier bed comprising a cord having runs disposed transversely of said arms and lugs extending inwardly from the lower ends of the forward portions of said downwardly extending flanges, and non-metallic members on said inwardly extending flanges and lugs, the members on the inwardly extending flanges projecting below the undersurfaces of said flanges, and the members and the lugs projecting above the upper surfaces of said lugs.

5. A remover frame comprising a frame member having parallel arms, said arms each being of angular cross-section and comprising an upper, inwardly extending flange and an outer downwardly extending flange, said downwardly extending flanges being formed with through openings, a carrier bed comprising a cord interlaced through said openings, means to anchor the ends of said cord, said cord substantially contacting the undersurfaces of said inwardly extending flanges of said arms, said arms being formed with through openings in advance of the carrier bed, screws extending through said openings, a cutter wire having its ends anchored to said screws, angle shaped plates on said arms, said angle shaped plates comprising horizontal flanges contacting the inwardly extending flanges of the arms, and vertical flanges contacting the outer surfaces of the downwardly extending flanges of said arms, said vertical flanges of said angle shaped members having means to prevent relative rotation between the screws and said angle shaped members, and nuts screwed onto said screws and contacting said vertical flanges of the angle shaped members.

6. A remover frame comprising a frame member having parallel arms, said arms each being of angular cross-section and comprising an upper, inwardly extending flange and an outer downwardly extending flange, a carrier bed interconnecting said arms, said arms being formed with through openings in advance of the carrier bed, screws extending through said openings, a metal cutter wire having its ends anchored to said screws, angle shaped plates on said arms, said angle shaped plates comprising horizontal flanges contacting the inwardly extending flanges of the arms, and vertical flanges contacting the outer surfaces of the downwardly extending flanges of said arms, said vertical flanges being formed with openings through which said screws pass, said openings each having a flat edge, and said screws having flats contacting the edges, whereby to prevent relative rotation between the screws and said angle shaped members, and nuts screwed onto said screws and flanges of the angle shaped members, said vertical flanges of said angle shaped members being formed with one or more detents and said nuts being formed with one or more slots engaging said detents.

7. A remover frame comprising a frame member having parallel arms, said arms each being of angular cross-section and comprising an upper, inwardly extending flange and an outer downwardly extending flange, said downwardly extending flanges being formed with through openings, a carrier bed comprising a cord interlaced through said openings, means to anchor the ends of said cord, said cord substantially contacting the undersurfaces of said inwardly extending flanges of said arms, said arms being formed with through openings in advance of the carrier bed, screws extending through said openings, a cutter wire having its ends anchored to said screws, angle shaped members on said arms, said angle shaped members comprising means to prevent relative rotation between the screws and said angle shaped members, and a nut screwed on to each screw and contacting said vertical flange of the angle shaped member, a pair of lugs extending inwardly from the lower ends of said downwardly extending flanges of said arms adjacent the forward ends of said arms, and underlying the inwardly extending flanges of said arms, and being formed with vertical through openings, and non-metallic inserts in said vertical through openings projecting above said lugs.

8. A remover frame comprising a frame member having parallel arms, said arms each being of angular cross-section and comprising an upper, inwardly extending flange and an outer downwardly extending flange, a carrier bed interconnecting said arms, said arms being formed with through openings in advance of the carrier bed, screws extending through said openings, a metal cutter wire having its ends anchored to said screws, means on said arms to prevent relative rotation between the screws and said arms, and a nut screwed onto each screw, a pair of lugs extending inwardly from the lower ends of said downwardly extending flanges of said arms adjacent the forward ends of said arms and underlying the inwardly extending flanges of said arms, and being formed with vertical through openings, and non-metallic inserts in said vertical through openings projecting above said lugs, and said inwardly extending flanges of said arms being formed at the forward ends thereof with vertical through openings, and non-metallic inserts therein projecting below the undersurfaces of said inwardly extending flanges of said arms.

MAURICE J. WEINBERG.

References Cited in the file of this patent

UNITED STATES PATENTS

| Number | Name | Date |
|---|---|---|
| 1,249,513 | Scanlan | Dec. 11, 1917 |
| 1,436,236 | Cartuschka | Nov. 21, 1922 |
| 1,714,495 | Case | May 28, 1929 |
| 2,114,277 | Bloomfield | Apr. 19, 1938 |